United States Patent
Onishi et al.

(10) Patent No.: US 7,436,993 B2
(45) Date of Patent: Oct. 14, 2008

(54) APPARATUS AND METHOD FOR DETECTING DEFECTS IN PERIODIC PATTERN ON OBJECT

(75) Inventors: Hiroyuki Onishi, Kyoto (JP); Yasushi Sasa, Kyoto (JP)

(73) Assignee: Dainippon Screen Mfg. Co., Ltd., Kyoto (JP)

( * ) Notice: Subject to any disclaimer, the term of this patent is extended or adjusted under 35 U.S.C. 154(b) by 503 days.

(21) Appl. No.: 11/079,331

(22) Filed: Mar. 15, 2005

(65) Prior Publication Data

US 2005/0232478 A1 Oct. 20, 2005

(30) Foreign Application Priority Data

Apr. 20, 2004 (JP) ............................ P2004-123622

(51) Int. Cl.
*G06K 9/00* (2006.01)
(52) U.S. Cl. .................... 382/149; 382/144; 382/151
(58) Field of Classification Search ................. 382/141, 382/144, 145, 149, 151, 304
See application file for complete search history.

(56) References Cited

U.S. PATENT DOCUMENTS

2002/0150286 A1 * 10/2002 Onishi ........................ 382/149
2004/0179727 A1 * 9/2004 Takeuchi .................... 382/145

FOREIGN PATENT DOCUMENTS

JP 60-57929 4/1985
JP 61-205811 9/1986

* cited by examiner

*Primary Examiner*—Colin LaRose
(74) *Attorney, Agent, or Firm*—McDermott Will & Emery LLP

(57) ABSTRACT

In a defect detection apparatus, images of first to third inspection areas on a substrate are picked up to acquire first to third images. A positional difference acquisition part (51) acquires a first difference vector between the first image and the second image and a second difference vector between the second image and the third image. A differential image generation part (52) generates a first differential image between the first image and the second image while adjusting a position of the first image to the second image on the basis of the first difference vector and a second differential image between the second image and the third image while adjusting a position of the second image to the third image on the basis of the second difference vector. Then, a position of the second differential image is adjusted to the first differential image on the basis of the second difference vector and the second differential image after position adjustment and the first differential image are compared with each other, to detect a defect in a periodic pattern on the substrate with high accuracy.

14 Claims, 10 Drawing Sheets

FIG. 4
|  | P11 | P12 | P13 | P14 | P15 |
|---|---|---|---|---|---|
| IMAGE ACQUISITION | A | B | C |  |  |
| OUTPUT OF FIRST DELAY CIRCUIT |  | A | B | C |  |
| INPUT OF FIRST COUNTER |  | A, B |  |  |  |
| INPUT OF SECOND COUNTER |  |  | B, C |  |  |
| SELECTION OF DIFFERENCE VECTOR |  |  | A, B | B, C |  |
| OUTPUT OF SECOND DELAY CIRCUIT |  |  | A | B | C |
| OUTPUT OF THIRD DELAY CIRCUIT |  |  |  | A | B |
| GENERATION OF DIFFERENTIAL IMAGE |  |  |  | A, B | B, C |
| POSITION ADJUSTMENT |  |  |  |  | BC |
| OUTPUT OF FOURTH DELAY CIRCUIT |  |  |  |  | AB |
| DEFECT DETECTION |  |  |  |  | AB, CB |
FIG. 5
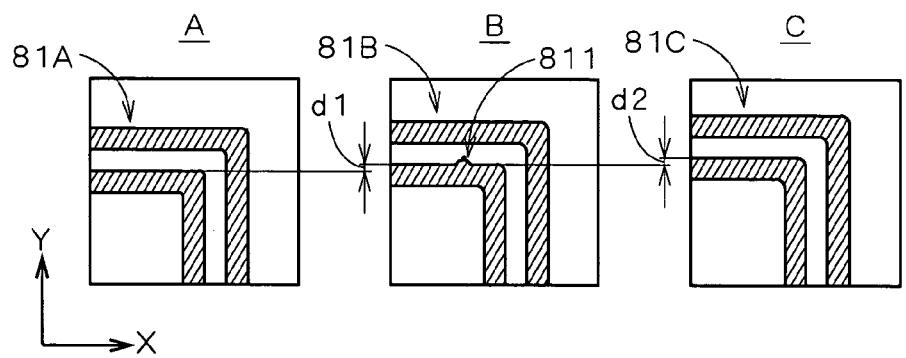
FIG. 6
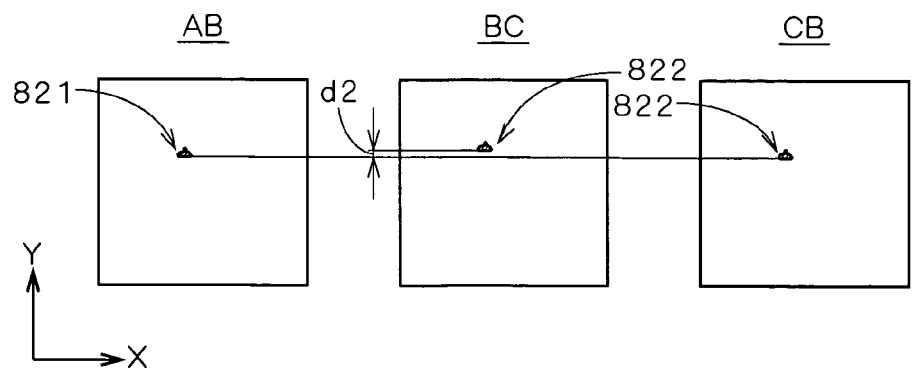

APPARATUS AND METHOD FOR DETECTING DEFECTS IN PERIODIC PATTERN ON OBJECT

BACKGROUND OF THE INVENTION

1. Field of the Invention

The present invention relates to a technique for detecting a defect in a periodic pattern on an object, which is used, for example, for appearance inspection of semiconductor substrates, printed circuit boards and the like.

2. Description of the Background Art

A variety of inspection methods have been used, conventionally, in a field of appearance inspection of semiconductor substrates, printed circuit boards and the like. Japanese Patent Application Laid Open Gazette No. 60-57929 (Document 1), for example, discloses a method of detecting a defect in an inspection image. In the method, the binary inspection image is moved to a plurality of positions relatively to the binary reference image, the number of pixels having different values between a binary inspection image and a binary reference image are counted up in the relative positions, a positional difference vector (hereinafter, referred to simply as "difference vector") between the inspection image and the reference image is obtained where the counted number of pixels is minimum, and a positional difference between the two images is corrected with the relative movement of the inspection image by the difference vector. Herein, the difference vector (positional difference vector) refers to a distance (vector) of movement of one of two images for adjustment to make patterns in the two images coincident. Japanese Patent Application Laid Open Gazette No. 61-205811 (Document 2) further discloses a method where a differential image is generated by comparison between a first image and a second image and another differential image is generated by comparison between the second image and a third image, and then the two differential images are compared with each other to detect a defect present in the second image.

In detection of defects by comparison between patterns of dies serving as chips on a semiconductor substrate (hereinafter, referred to as "substrate"), by using the method of Document 2, if the direction of arrangement of dies and the direction of movement of the substrate relative to an image pickup part slightly become out of line, there arises a positional difference in images of a plurality of dies. As a result, for example, when it is intended to sequentially acquire three images and sequentially generate two differential images to compare these differential images with each other, since there is a difference in position between the corresponding pixels of the two differential images, it is impossible to detect any defect with accuracy. Especially, in recent, with miniaturization of patterns on a substrate, the size of defect to be detected becomes smaller and an area on a substrate corresponding to one pixel in an image becomes smaller, and therefore, even if the inclination of the substrate is mechanically corrected, there arises an appreciable level of positional difference among a plurality of acquired images.

SUMMARY OF THE INVENTION

The present invention is intended for an apparatus for detecting a defect in a periodic pattern on an object. According to an aspect of the present invention, the apparatus comprises an image pickup part for picking up an image of an object; a positional difference acquisition part for acquiring a first positional difference vector between a first image in a first area on an object and a second image in a second area which has the same pattern as that of the first area and acquiring a second positional difference vector between the second image and a third image in a third area which has the same pattern as that of the second area; a differential image generation part for generating a first differential image between the first image and the second image while adjusting a position of the first image relatively to the second image on the basis of the first positional difference vector and generating a second differential image between the second image and the third image while adjusting a position of the second image relatively to the third image on the basis of the second positional difference vector in the same manner as the case of the first positional difference vector; a position adjustment part for adjusting a position of the first differential image relatively to the second differential image on the basis of the first positional difference vector or the second positional difference vector; and a defect detection part for detecting a defect by comparison between the first differential image after position adjustment and the second differential image.

In this apparatus, since the position of the first differential image is adjusted relatively to the second differential image on the basis of the first positional difference vector or the second positional difference vector, it is possible to detect a defect in a periodic pattern on the object with high accuracy.

More specifically, the positional difference acquisition part comprises a plurality of first differential circuits for sequentially outputting, in parallel, pixels of a plurality of differential images between two images in two areas which are simultaneously inputted thereto, one of which is moved relatively to the other image in a plurality of different manners; and a positional difference selection circuit for selecting a positional difference vector between the two images which corresponds to the minimum one among a plurality of additional values obtained by adding up outputs from the plurality of first differential circuits, and the differential image generation part comprises a plurality of second differential circuits for sequentially outputting, in parallel, pixels of a plurality of differential images between two images which are simultaneously inputted thereto behind those inputted to the plurality of first differential circuits, one of which is moved relatively to the other image in a plurality of different manners; and a differential selection circuit for selecting one of outputs from the plurality of second differential circuits on the basis of the positional difference vector selected by the positional difference selection circuit.

According to another aspect of the present invention, the apparatus comprises an image pickup part for picking up an image of an object; a first positional difference acquisition part for acquiring a first positional difference vector between a first image in a first area on an object and a second image in a second area which has the same pattern as that of the first area; a second positional difference acquisition part for acquiring a second positional difference vector between the second image and a third image in a third area which has the same pattern as that of the second area, in parallel with an operation of the first positional difference acquisition part; a first differential image generation part for generating a first differential image between the first image and the second image while adjusting a position of the first image to the second image on the basis of the first positional difference vector; a second differential image generation part for generating a second differential image between the second image and the third image while adjusting a position of the third image to the second image on the basis of the second positional difference vector, in parallel with an operation of the first differential image generation part; and a defect detection part for detecting a defect by comparison between the first differential image and the second differential image.

Since the first differential image and the second differential image are generated on the basis of the second image, it is possible to detect a defect in a periodic pattern on the object with high accuracy.

Further, the first differential image and the second differential image may be generated as grayscale images.

The present invention is also intended for a method of detecting a defect in a periodic pattern on an object.

These and other objects, features, aspects and advantages of the present invention will become more apparent from the following detailed description of the present invention when taken in conjunction with the accompanying drawings.

BRIEF DESCRIPTION OF THE DRAWINGS

FIG. 4 is a time chart for an operation of defect detection;

FIG. 5 is a view showing exemplary acquired images;

FIG. 6 is a view showing differential images;

DESCRIPTION OF THE PREFERRED EMBODIMENTS

Figure 1:
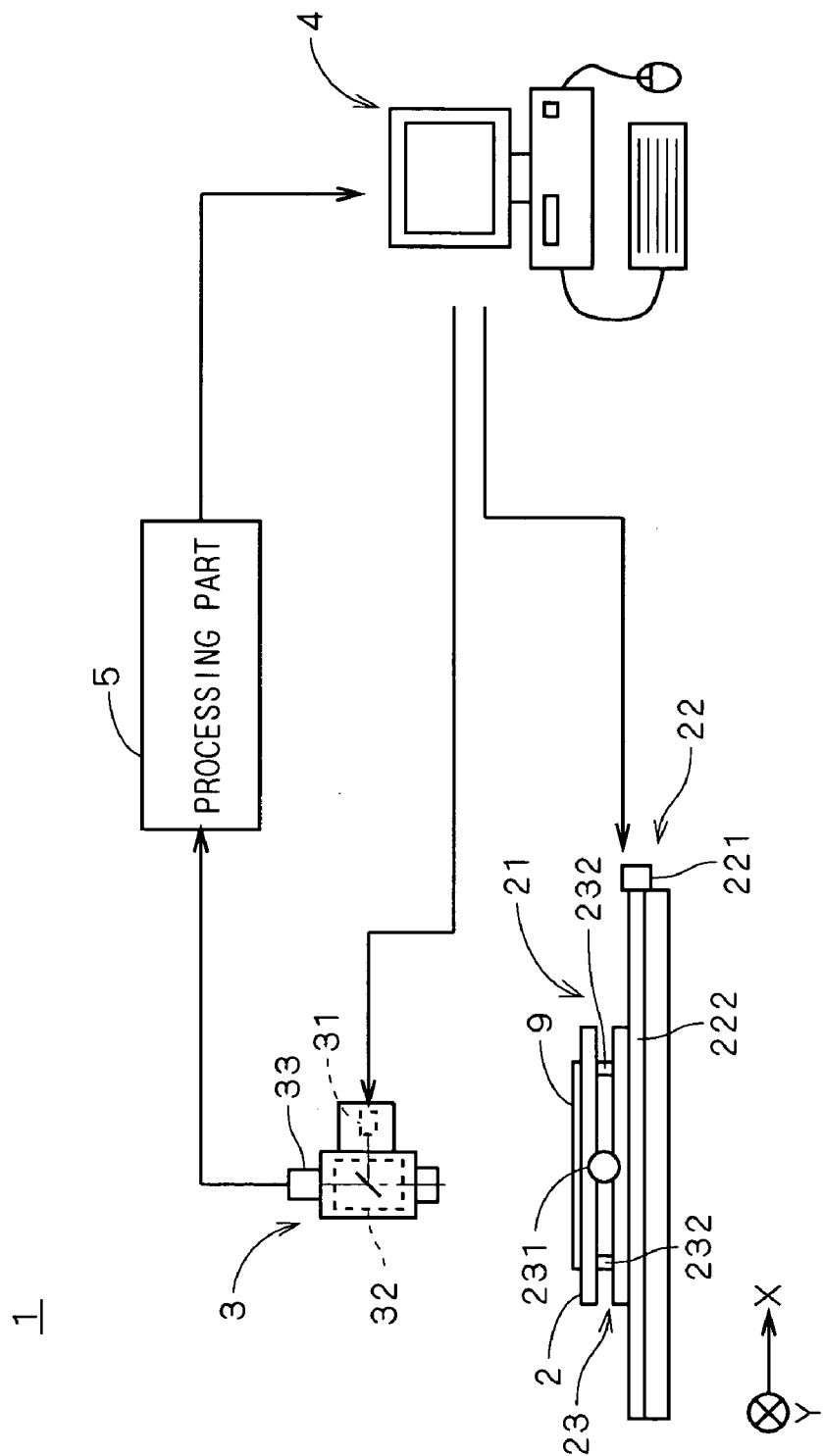
FIG. 1 is a view showing a construction of a defect detection apparatus in accordance with a first preferred embodiment.

FIG. 1 is a view showing a construction of a defect detection apparatus 1 in accordance with the first preferred embodiment of the present invention. The defect detection apparatus I comprises a stage 2 for holding a substrate 9 on which a periodic pattern is formed, an image pickup part 3 for picking up an image of the substrate 9 to acquire image data of the substrate 9 and a stage driving part 21 for moving the stage 2 relatively to the image pickup part 3.

The stage driving part 21 has an X-direction moving mechanism 22 for moving the stage 2 in the X direction of FIG. 1 and a Y-direction moving mechanism 23 for moving the stage 2 in the Y direction. The X-direction moving mechanism 22 has a motor 221 to which a ball screw (not shown) is connected and with rotation of the motor 221, the Y-direction moving mechanism 23 moves along guide rails 222 in the X direction of FIG. 1. The Y-direction moving mechanism 23 has the same structure as the X-direction moving mechanism 22 has, and with rotation of a motor 231, the stage 2 is moved along guide rails 232 in the Y direction of FIG. 1 by a ball screw (not shown).

The image pickup part 3 has a lighting part 31 for emitting an illumination light, an optical system 32 which guides an illumination light to the substrate 9 and receives a light from the substrate 9 and a line sensor 33 of CCD for converting an image of the substrate 9 which is formed by the optical system 32 into an electrical signal, and with movement of the substrate 9 by the stage driving part 21 in a direction perpendicular to the direction of arrangement of light receiving elements in the line sensor 33, the line sensor 33 outputs two-dimensional image data. In this preferred embodiment, a binarization circuit in the image pickup part 3 acquires a binary image.

The defect detection apparatus 1 further comprises a processing part 5 to which pixel values of the image acquired by the image pickup part 3 are sequentially inputted and a computer 4 constituted of a CPU for performing various computations, a memory for storing various pieces of information and the like. The computer 4 serves as a control part for controlling these constituent elements in the defect detection apparatus 1.

Figure 2:
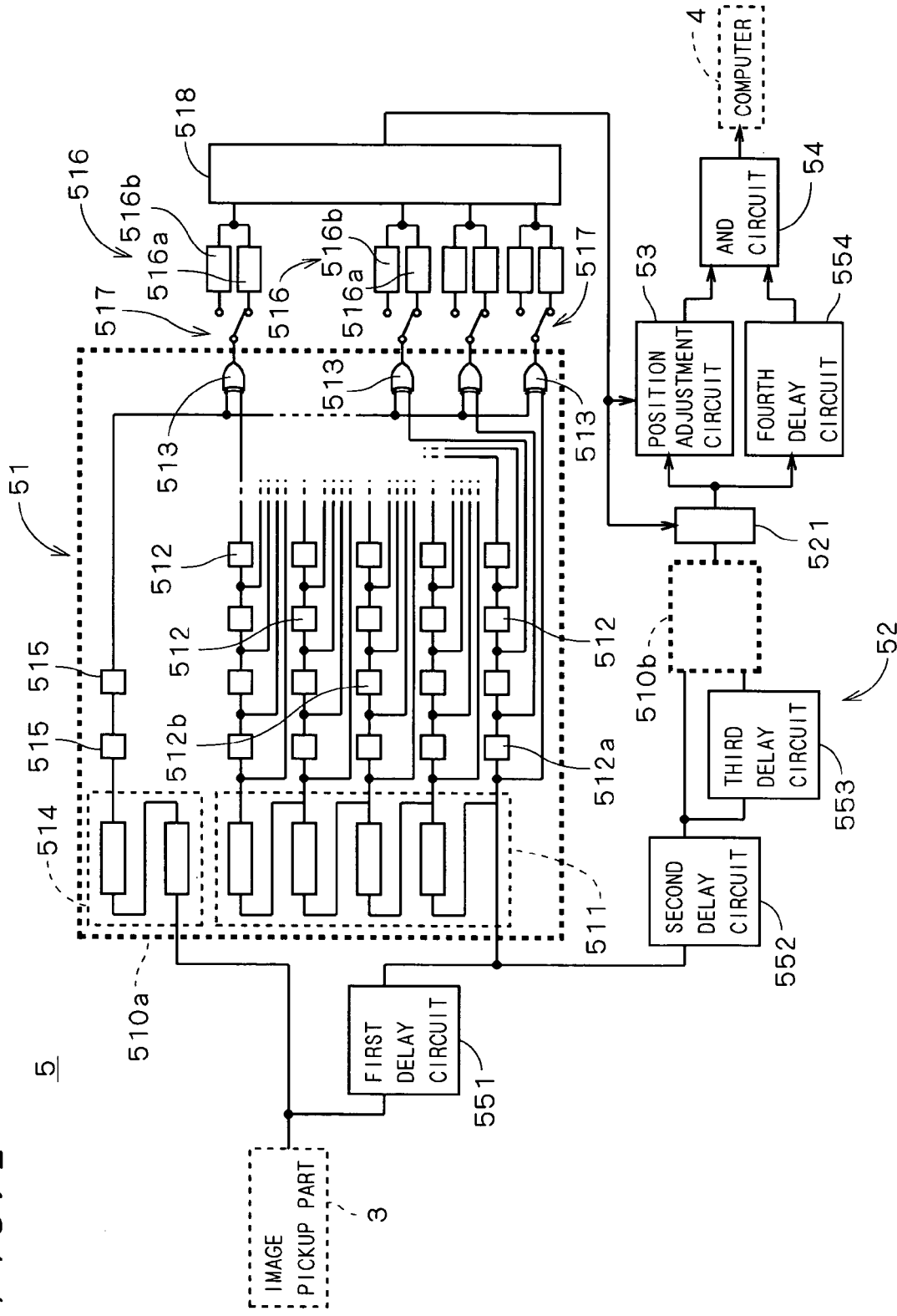
FIG. 2 is a view showing a construction of a processing part.

FIG. 2 is a view showing a construction of the processing part 5. The processing part 5 has a positional difference acquisition part 51 for acquiring a difference vector (positional difference vector) between successively-acquired two images among a plurality of acquired images, a differential image generation part 52 for generating a differential image while correcting a positional difference of the two images on the basis of the acquired difference vector, a position adjustment circuit 53 for adjusting a position of another differential image which has been already generated with different timing relatively to the generated differential image and an AND circuit 54 for detecting a defect by comparison between the two differential images after position adjustment.

The pixel values of the acquired image are sequentially outputted to the positional difference acquisition part 51 and a first delay circuit 551, and the first delay circuit 551 delays the inputted pixel values by one image and then outputs the delayed pixel values to the positional difference acquisition part 51 and the differential image generation part 52. Thus, the positional difference acquisition part 51 simultaneously receives the pixel values of the image which is directly inputted from the image pickup part 3 and the corresponding pixel values of an image acquired immediately before this image. In the following discussion, the image which is directly inputted from the image pickup part 3 is referred to as "following image" and the image which is acquired immediately before the following image is referred to as "antecedent image".

The positional difference acquisition part 51 has a line buffer 511 to which pixel values of the antecedent image is inputted, a plurality of shift registers 512 arranged in predetermined row and column directions and a plurality of exclusive OR circuits (hereinafter, referred to as "XOR circuits") 513 for outputting exclusive ORs of the inputted pixel values of the two images (i.e., the pixel values of the antecedent image and the following image). In the following discussion, it is assumed that the shift registers 512 are arranged in a matrix with five rows and four columns, but in actual, a large number of shift registers 512 are arranged in the positional difference acquisition part 51.

To the first shift register 512 on the side of line buffer 511 in each line of the shift registers 512 arranged in the row direction (the transverse direction), the pixel values delayed in accordance with its row number are inputted from the line buffer 511. In other words, when the value of one specified pixel in the antecedent image is inputted to the first shift register 512a in the lowermost row (the first row), the pixel value which is inputted antecedently to the specified pixel value by one line is inputted to the first shift register 512 in the one-upper row (the second row) and the pixel value which is inputted antecedently to the specified pixel value by four lines is inputted to the first shift register 512 in the uppermost row (the fifth row). When one pixel value is inputted to each of a plurality of shift registers 512 arranged in the row direction from the adjacent shift register 512 on the side of line buffer 511 or the line buffer 511, the shift register 512 outputs this pixel value to an adjacent shift register 512 on the opposite side of the line buffer 511 (downstream) (so long as the downstream adjacent shift register 512 is present) in accordance with the next clock pulse.

At this time, five pixel values inputted to the respective first shift registers 512 in all the rows and a plurality of pixel values outputted from a plurality of shift registers 512 are inputted to a plurality of corresponding XOR circuits 513. Therefore, on the whole, pixel values included in part of the antecedent image are simultaneously inputted to the corresponding XOR circuits 513.

The positional difference acquisition part 51 has a line buffer 514 to which pixel values of the following images are sequentially inputted and two shift registers 515. By the line buffer 514 and the two shift registers 515, the pixel value of the following image corresponding to the pixel value (hereinafter, referred to as "pixel value of reference position") outputted from the second shift register 512b of the third row in the arrangement of the shift registers 512 is simultaneously inputted to the XOR circuits 513. In other words, when a value of one specified pixel in the following image is inputted to the XOR circuits 513, a value of a pixel in the antecedent image corresponding to the specified pixel and values of a plurality of pixels around the corresponding pixel are inputted to the XOR circuits 513.

The positional difference acquisition part 51 has a plurality of counter parts 516 each having two counters 516a and 516b, a plurality of counter switching parts 517 for switching the counters 516a and 516b and a positional difference selection circuit 518 connected to a plurality of counter parts 516. A value outputted from each of the XOR circuits 513 is inputted to one of the two counters 516a and 516b through the counter switching part 517 and added up therein, and additional values in a plurality of counter parts 516 are outputted to the positional difference selection circuit 518.

The differential image generation part 52 has a second delay circuit 552 to which pixel values from the first delay circuit 551 are inputted, a third delay circuit 553 to which the pixel values from the second delay circuit 552 are inputted, a second differential circuit matrix 510b having the same construction as surrounded by a rectangular represented by reference sign 510a of FIG. 2 (hereinafter, referred to as "a first differential circuit matrix 510a") and a differential selection circuit 521 for selecting a plurality of values from a plurality of XOR circuits 513 in the second differential circuit matrix 510b. To the second differential circuit matrix 510b, pixel values of an image acquired by the first and second delay circuits 551 and 552 antecedently to the above following image (i.e., the image on the way of acquisition by the image pickup part 3) by two images and pixel values of an image acquired by the first to third delay circuits 551 to 553 antecedently to the above following image by three images are simultaneously inputted. The positional difference acquisition part 51 and the differential image generation part 52 can be easily formed of the first differential circuit matrix 510a and the second differential circuit matrix 510b as electric circuits.

The processing part 5 further has a fourth delay circuit 554 for delaying a value inputted from the differential selection circuit 521 by one image and outputting the delayed value. To the AND circuit 54, two values are inputted from the position adjustment circuit 53 and the fourth delay circuit 544.

Figure 3:
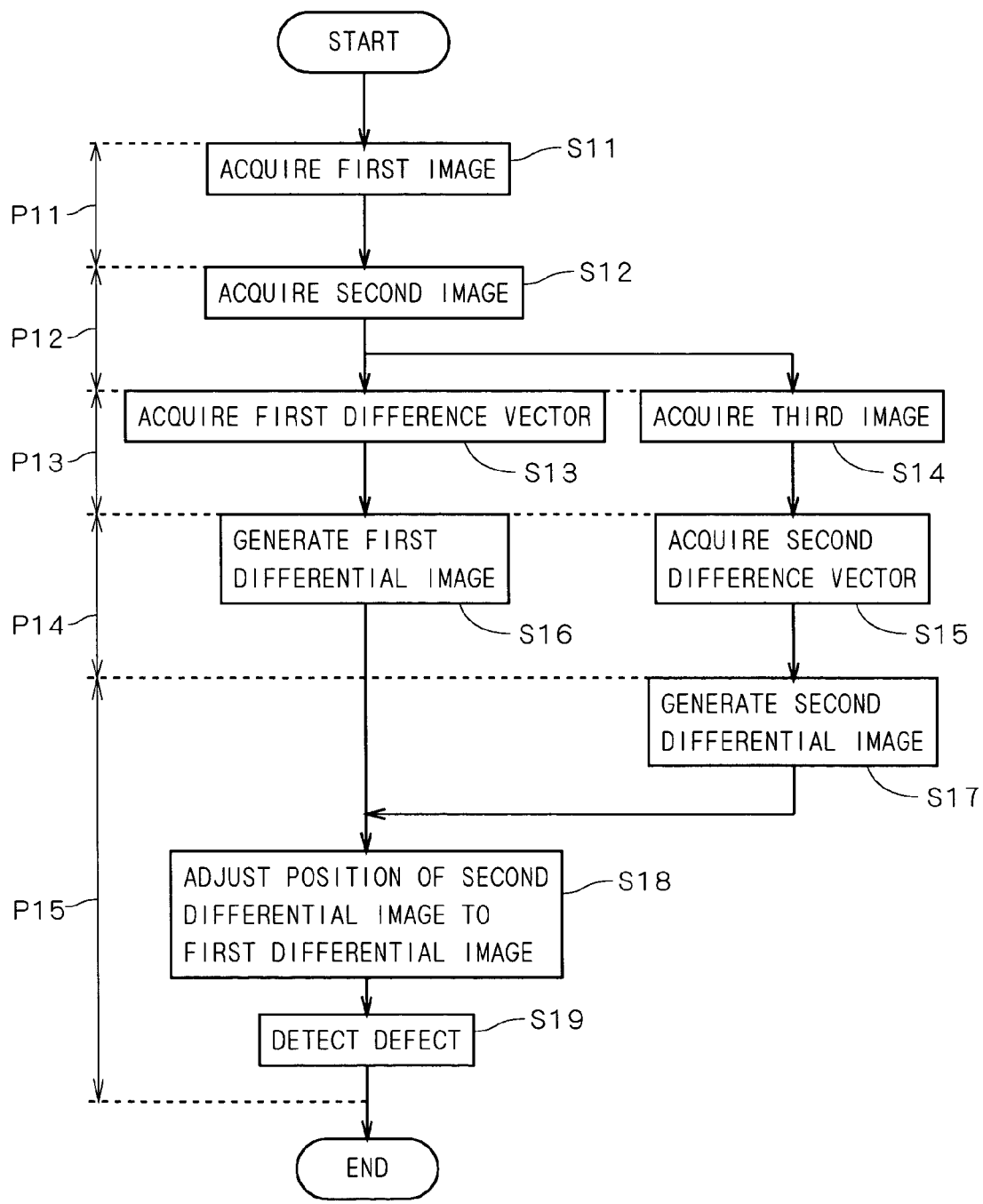
FIG. 3 is a flowchart showing an operation flow for detecting a defect on a substrate.

FIG. 3 is a flowchart showing an operation flow of the defect detection apparatus 1 for detecting a defect on the substrate 9. FIG. 4 is a time chart for an operation of defect detection in the defect detection apparatus 1, explaining images to be processed in the periods P11 to P15 of FIG. 3. In FIG. 4, the images to be processed are shown, with reference signs given to images described in the following discussion. Hereinafter, referring to FIGS. 2 to 4, the defect detection process performed by the defect detection apparatus 1 will be discussed along the steps of FIG. 3.

In the defect detection apparatus 1, first, one inspection area (hereinafter, referred to as "a first inspection area") on the substrate 9 is adjusted to an image pick-up position of image pickup part 3 by the stage driving part 21 and an image of the first inspection area is acquired (Step S11). Hereinafter, an image of the first inspection area is referred to as "a first image").

FIG. 5 is a view showing exemplary acquired images, where three images are aligned. The left one of FIG. 5 is a first image A, and images on the center and the right are two images B and C as discussed later. A predetermined wiring pattern is formed in the first inspection area on the substrate 9 and the first image A includes a pattern 81A of wiring as shown in the left one of FIG. 5. In the period P11 of FIG. 4, pixel values in the first image A outputted from the image pickup part 3 are sequentially inputted to the positional difference acquisition part 51 and the first delay circuit 551 shown in FIG. 2.

After the first image A is acquired, another inspection area (hereinafter, referred to as "a second inspection area") on the substrate 9 which is located away from the first inspection area by a predetermined cycle (or geometric period) (for example, a distance between centers of patterns of dies arranged on the substrate 9) is adjusted to the image pick-up position and an image of the second inspection area (hereinafter, referred to as "a second image") B which is shown in the center of FIG. 5 is acquired (Step S12). In the second inspection area on the substrate 9, the same pattern is formed as that in the first inspection area, and the second image B includes the same pattern 81B as the pattern 81A as shown in the center of FIG. 5. In the pattern 81B, there is a very small defect represented by reference numeral 811. Between the first image A and the second image B, for example, there arises a positional difference which is caused in a case where the direction of movement of the stage 2 by the stage driving part 21 and the direction of arrangement of patterns on the substrate 9 are inclined slightly, and between the pattern 81A of the first image A and the pattern 81B of the second image B, there is a positional difference in the Y direction by a distance d1. It is assumed that there arises almost no positional difference in the X direction.

In the period P12 of FIG. 4, pixel values of the second image B outputted from the image pickup part 3 are sequentially inputted to the positional difference acquisition part 51 and the first delay circuit 551 of FIG. 2, and in parallel with that, the corresponding pixel values of the first image A are outputted from the first delay circuit 551 to the positional difference acquisition part 51 and the second delay circuit 552. With this operation, a pixel value of one position of the second image B is inputted to a plurality of XOR circuits 513 in the first differential circuit matrix 510a and a plurality of pixel values of positions around the corresponding position (included) in the first image A are inputted thereto, respectively, at the same time, and each XOR circuit 513 outputs an exclusive OR of the two pixel values which are simultaneously inputted. Specifically, when the pixel values of the two images A and B coincide with each other, the XOR circuit 513 outputs "0" and when not coincide, the XOR circuit 513 outputs "1".

At this time, in the counter switching part 517, each XOR circuit 513 is connected to one of the counters 516a (hereinafter, referred to as "the first counters 516a") and a plurality of first counters 516a add up the outputs from a plurality of XOR circuits 513, and when all the pixel values of the first image A and the second image B are inputted to the XOR circuits 513, a plurality of final additional values are obtained. Thus, a plurality of XOR circuits 513 sequentially output pixel values of a plurality of differential images of the two images A and B, in parallel, with the first image A moved relatively to the second image B in a plurality of manners, and the sums of pixel values of a plurality of differential images are accumulated in a plurality of first counters 516a. In the period P12 of FIG. 4, expression of "A, B" in the column of "First Counter Input" indicates that the pixel values of a plurality of differential images of the two images A and B are added up.

Subsequently, each of a plurality of first counters 516a outputs the additional value to the positional difference selection circuit 518, one of the XOR circuits 513 corresponding to one of the counters 516a which outputs the minimum additional value is specified. Since a plurality of XOR circuits 513 correspond to the pixel value of the reference position and a plurality of pixel values of positions around the reference position as discussed above and the reference position is a position with difference vector of 0, specifying one of the XOR circuits 513 by the positional difference selection circuit 518 substantially means acquisition of the difference vector between the two images A and B. In other words, the position of the pixel value inputted to the specified XOR circuit 513 relative to the reference position in the X and Y directions corresponds to the difference vector between the two images A and B (hereinafter, referred to as "the first difference vector") (Step S13). In this case, it is assumed that the first difference vector is obtained as the number of pixels, where the difference in the X direction is 0 and the difference in the Y direction is the distance d1 of FIG. 5. The first difference vector is outputted to the differential selection circuit 521 in the differential image generation part 52 and the position adjustment circuit 53.

On the other hand, in the period P13 while the first difference vector is acquired, still another inspection area (hereinafter, referred to as "a third inspection area") on the substrate 9 which is located away from the second inspection area by a cycle equal to the distance between the first inspection area and the second inspection area is adjusted to the image pickup position and an image of the third inspection area (hereinafter, referred to as "a third image") C which is shown on the right side of FIG. 5 is acquired (Step S14). Also on the third inspection area of the substrate 9, the same pattern is formed as that on the second inspection area (or the first inspection area), and the third image C includes the same pattern 81C as the pattern 81B. Though the third image C may have a defect, the following discussion will be made assuming that no defect is present there. Also between the second image B and the third image C, there similarly arises a positional difference, and between the pattern 81B of the second image B and the pattern 81C of the third image C, there is a positional difference in the Y direction by a distance d2. It is assumed that there arises almost no positional difference in the X direction. Normally, since the distance between the first image A and the second image B is set equal to that between the second image B and the third image C, the distance d2 becomes equal to the distance d1.

The pixel values of the third image C acquired in the period P13 of FIG. 4 are sequentially outputted to the positional difference acquisition part 51 and the first delay circuit 551 while the corresponding pixel values of the second image B are outputted from the first delay circuit 551 to the positional difference acquisition part 51 and the second delay circuit 552. At this time, each of the XOR circuits 513 is connected to the other counter 516b (hereinafter, referred to as "a second counter 516b"), and a plurality of XOR circuits 513 sequentially output pixel values of a plurality of differential images of the two images B and C, in parallel, with the third image C moved relatively to the second image B in a plurality of manners, and a plurality of second counters 516b acquire additional values of the pixel values in a plurality of differential images.

In parallel with output of the pixel values of the second image B from the first delay circuit 551, the pixel values of the first image A are outputted from the second delay circuit 552 to the second differential circuit matrix 510b and the third delay circuit 553. In this stage, the pixel values inputted to the second differential circuit matrix 510b are ignored.

Subsequently, a plurality of additional values are outputted from a plurality of second counters 516b to the positional difference acquisition part 51, and a difference vector (hereinafter, referred to as "a second difference vector") between the two images B and C corresponding to the minimum one of the additional values is selected (Step S15). Herein, it is assumed that the second difference vector is obtained as the number of pixels, where the difference vector in the X direction is 0 and the difference vector in the Y direction is the distance d2 of FIG. 5. The second difference vector is outputted to the differential selection circuit 521 and the position adjustment circuit 53.

In the period P14 of FIG. 4 while the second difference vector is acquired, the pixel values of the third image C are outputted from the first delay circuit 551 to the positional difference acquisition part 51 and the second delay circuit 552. In parallel with this output, the pixel values of the second image B are outputted from the second delay circuit 522 to the second differential circuit matrix 510b and the third delay circuit 553 while the corresponding pixel values of the first image A are outputted from the third delay circuit 553 to the second differential circuit matrix 510b.

Each of a plurality of XOR circuits 513 in the second differential circuit matrix 510b outputs an exclusive OR of the pixel values of the two images A and B which are simultaneously inputted, behind the input in the first differential circuit matrix 510a. In other words, the pixel values of a plurality of differential images of the two images A and B with the first image A moved relatively to the second image B in a plurality of manners are sequentially outputted to the differential selection circuit 521, in parallel. In the differential selection circuit 521, one of a plurality of XOR circuits 513 in the second differential circuit matrix 510b located at a position corresponding to the XOR circuit 513 in the first differential circuit matrix 510a which is selected by the positional difference selection circuit 518 in the acquisition of the first difference vector is specified on the basis of the first difference vector and the output of the specified XOR circuit 513 is selected. The differential image generation part 52 thereby generates a differential image (hereinafter, referred to as "a first differential image") between the first image A and the second image B while positionally adjusting the first image A to the second image B on the basis of the first difference vector (Step S16).

FIG. 6 is a view showing three differential images generated in the differential image generation part 52. The left one represents a first differential image AB, and the central one and the right one represent the differential images BC and CB which will be discussed later, respectively. As shown in the left of FIG. 6, in the first differential image AB, there arises a difference in pixel value between the first image A after position adjustment and the second image B in a group of pixels represented by reference numeral 821. In actual, the pixel values of the first differential image AB are sequentially outputted to the position adjustment circuit 53 and the fourth delay circuit 554. In this stage, the pixel values of the first differential image AB inputted to the position adjustment circuit 53 are ignored.

Subsequently, in the period P15 of FIGS. 3 and 4, the pixel values of the third image C are outputted from the second delay circuit 552 to the second differential circuit matrix 510b and the third delay circuit 553 while the corresponding pixel values of the second image B are outputted from the third delay circuit 553 to the second differential circuit matrix 510b. Then, the second differential circuit matrix 510b and the differential selection circuit 521 generate a differential image (hereinafter, referred to as "a second differential image") BC between the second image B and the third image C on the basis of the second differential image while positionally adjusting the second image B to the third image C as shown in the center of FIG. 6 in the same manner as the first differential image is generated on the basis of the first difference vector (Step S17). At this time, also in the differential image BC, there arises a difference in pixel value between the second image B after position adjustment and the third image C in a group of pixels represented by reference numeral 822, and there arises a positional difference between the pixel group 821 and the pixel group 822 by the distance d2 in the Y direction.

The pixel values of the second differential image BC are sequentially outputted to the position adjustment circuit 53 and the fourth delay circuit 554 and in parallel with this output, the pixel values of the first differential image AB are outputted from the fourth delay circuit 554 to the AND circuit 54. In the position adjustment circuit 53, the second differential image BC shown in the center of FIG. 6 is not shifted in the X direction and is shifted by (−d2) in the Y direction. As a result, the second differential image BC is positionally adjusted to the first differential image AB to become a second differential image CB shown on the right side of FIG. 6.

In general, when the third image C has a positional difference relatively to the second image B by dx in the X direction and dy in the Y direction, by shifting the second differential image BC by (−dx) in the X direction and (−dy) in the Y direction on the basis of the second difference vector to be outputted to the AND circuit 54, the position of the second differential image BC is substantially adjusted to the first differential image AB (Step S18). Normally, since the first difference vector and the second difference vector are equal to each other, the second differential image BC may be shifted on the basis of the first difference vector.

Figure 7:
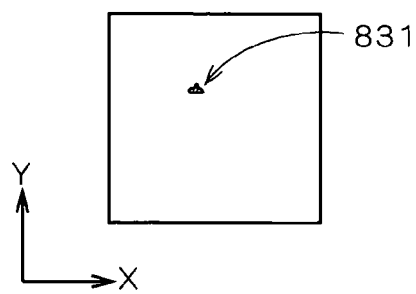
FIG. 7 is a view showing a defect detection image.

In the AND circuit 54, the pixel values of the first differential image AB outputted from the fourth delay circuit 554 and the corresponding pixel values of the second differential image CB after position adjustment by the position adjustment circuit 53 are compared with each other, and when both pixel values are "1", "1" indicating defective is outputted and otherwise "0" indicating nondefective (normal) is outputted. A defect detection image B2 indicating that a defect 831 is present as shown in FIG. 7 is generated by the AND circuit 54 and the defect 811 in the second image B is detected (Step S19).

Thus, in the defect detection apparatus 1, difference vectors between adjacent two images among a plurality of acquired images are obtained, and differential images are sequentially generated, on each of which the positional difference between the two images is corrected on the basis of the difference vector. Then, to one generated differential image, the next differential image is positionally adjusted and the two images after position adjustment are compared with each other to detect a defect.

Figure 8:
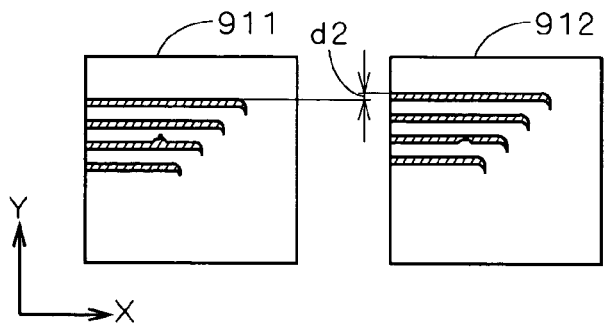
FIG. 8 is a view showing two differential images generated by a conventional defect detection apparatus.
Figure 9:
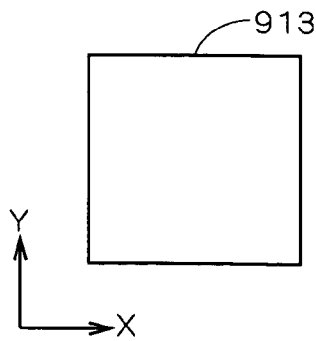
FIG. 9 is a view showing a defect detection image generated by a conventional defect detection apparatus.

When the three images A, B and C shown in FIG. 5 are acquired in the conventional defect detection apparatus, a differential image 911 shown on the left side of FIG. 8 between the first image A and the second image B is generated and a differential image 912 shown on the right side of FIG. 8 between the second image B and the third image C is generated, being shifted by the distance d2 in the Y direction relatively to the differential image 911. Therefore, with comparison between the differential image 911 and the differential image 912, a defect detection image 913 shown in FIG. 9 is generated and the defect 811 in the second image B (see FIG. 5) can not be detected. In contrast to this conventional case, in the defect detection apparatus 1 of FIG. 1, the first differential image AB is generated between the first image A after position adjustment and the second image B and the second differential image BC is also generated between the second image B after position adjustment and the third image C, and further the position of the second differential image BC is adjusted to the first differential image AB and then the second differential image CB after position adjustment and the first differential image AB are compared with each other. With this operation, the defect detection apparatus 1 can detect a defect in a periodic pattern on the substrate 9 with high accuracy without an effect of inclination of the substrate 9 (in other words, a slight difference in orientation).

In the defect detection apparatus 1, since the process step for acquiring the third image C and that for acquiring the first difference vector are executed in parallel and the first differential image AB is generated in parallel with the process step for acquiring the second difference vector, an operation of detecting a defect can be performed quickly. In the position adjustment circuit 53, the position of the first differential image AB may be adjusted to the second differential image BC by additionally providing a delay circuit in an immediately antecedent stage (on the upstream side), for example.

Figure 10:
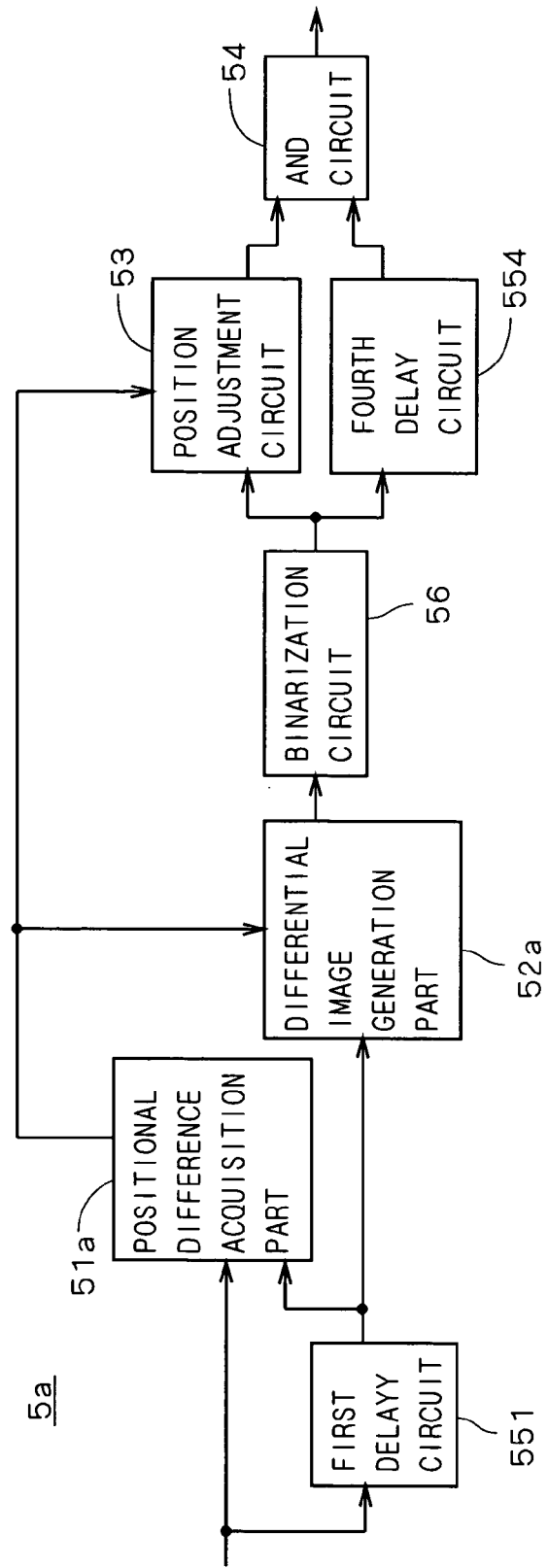
FIG. 10 is a view showing another example of the processing part.

FIG. 10 is a view showing a processing part 5a which is a modified one in the defect detection apparatus 1. In the processing part 5a of FIG. 10, a grayscale image (multitone image) is inputted thereto from the image pickup part 3, and each of the XOR circuits 513 in the first differential circuit matrix 510a of a positional difference acquisition part 51a and the second differential circuit matrix 510b of a differential image generation part 52a (see FIG. 2) is changed to a differential absolute value calculation circuit for outputting a differential absolute value of two inputted pixel values, and a binarization circuit 56 is additionally provided between the differential image generation part 52a and the position adjustment circuit 53 and the fourth delay circuit 554. Constituent elements other than the above are identical to those in the processing part 5 of FIG. 2 and represented by the same reference signs. As discussed above, the differential image generation part 52a includes the second delay circuit 552 and the third delay circuit 553.

In a defect detection process by the defect detection apparatus 1 having the processing part 5a of FIG. 10, a difference vector is acquired on the basis of the minimum one of additional values of pixel values in a plurality of differential absolute value images which are obtained by moving two images acquired in Steps S13 and S15 of FIG. 3 relatively to each other in a plurality of manners. In Step S16, one of a plurality of differential absolute value calculation circuits in the second differential circuit matrix 510b is selected on the basis of the first difference vector, and a first differential image (exactly, a differential absolute value image) between a first image and a second image is thereby generated while the first image is positionally adjusted to the second image. The pixel values of the first differential image is binarized with a predetermined threshold value by the binarization circuit 56, and the binarized pixel values are sequentially outputted to the position adjustment circuit 53 and the fourth delay circuit 554. Similarly in Step S17, a second differential image (differential absolute value image) between the second image and a third image is generated while the second image is positionally adjusted to the third image, and the pixel values binarized by the binarization circuit 56 are sequentially outputted to the position adjustment circuit 53 and the fourth delay circuit 554.

In the position adjustment circuit 53, by controlling the output timing of the pixel values of the binarized second differential image on the basis of the second difference vector, the position of the second differential image in binary is adjusted to the first differential image in binary (Step S18). Then, in the AND circuit 54, the pixel values of the second differential image after position adjustment and the corresponding pixel values of the first differential image are compared with each other, and the defect detection image is thereby generated to detect a defect (Step S19). Thus, in the defect detection apparatus having the processing part 5a of FIG. 10, it is possible to detect a defect in a periodic pattern on the substrate 9 on the basis of the grayscale image acquired by the image pickup part 3 with high accuracy.

Figure 11:
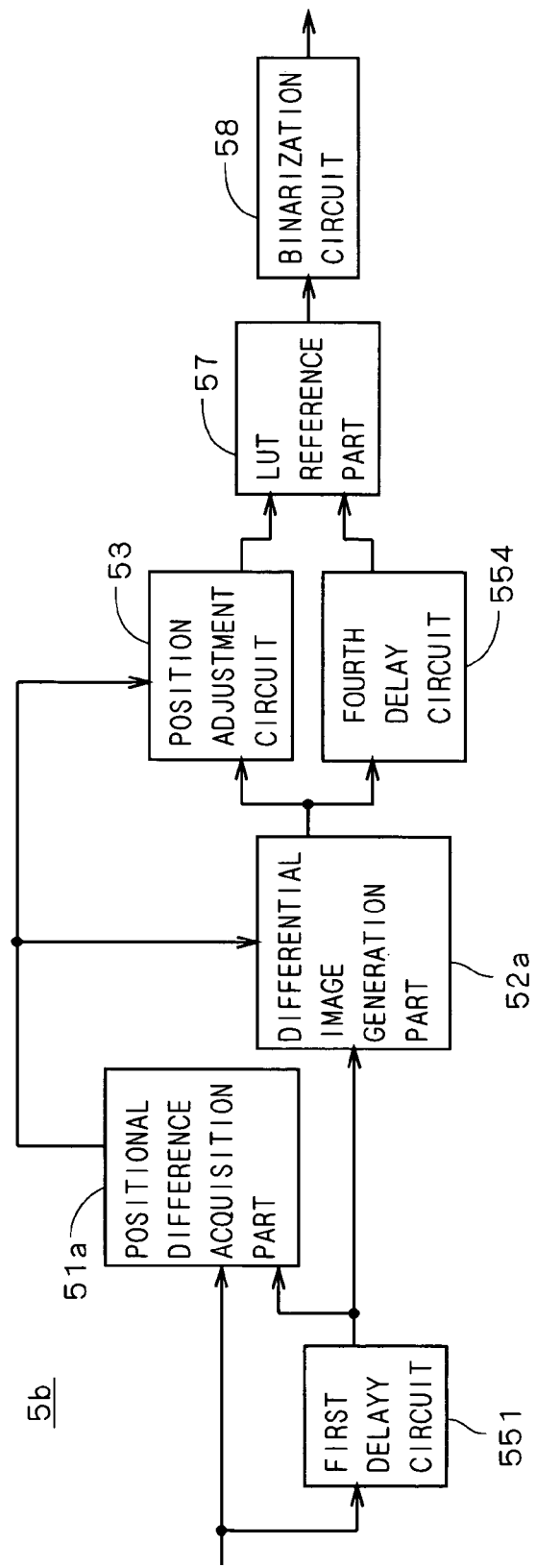
FIG. 11 is a view showing still another example of the processing part.

FIG. 11 is a view showing still another example of a processing part 5b in the defect detection apparatus 1. Also in the processing part 5b, pixel values of an acquired grayscale image are inputted thereto by the image pickup part 3. In the processing part 5b, in comparison with the processing part 5a of FIG. 10, an LUT reference part 57 for making reference to a predetermined look-up table (LUT) and outputting an value and a binarization circuit 58 are provided instead of the AND circuit 54, and the pixel values of the differential image from the differential image generation part 52a are directly inputted to the position adjustment circuit 53 and the fourth delay circuit 554.

In the defect detection apparatus 1 having the processing part 5b, the pixel values of the first differential image generated in the differential image generation part 52a are inputted to the position adjustment circuit 53 and the fourth delay circuit 554 (see FIG. 3: Step S16), and the pixel values of the second differential image which is subsequently generated are also inputted to the position adjustment circuit 53 and the fourth delay circuit 554 (Step S17). The position of the second differential image is adjusted to the first differential image (Step S18) in the position adjustment circuit 53, and to the LUT reference part 57, the pixel values of the first differential image are inputted from the fourth delay circuit 554 while the corresponding pixel values of the second differential image after position adjustment are inputted from the position adjustment circuit 53.

In the LUT reference part 57, a new image indicating an area where both the pixel values of the first differential image and the second differential image are large is substantially generated. Specifically, with each pixel value a of the first differential image and a corresponding pixel value b of the second differential image, a value of the square root of (a×b), a value of ((a×b)/255) (assuming that an image of 256-level grayscale ranging from 0 to 255 is acquired by the image pickup part 3) or the like is outputted by making reference to the LUT. In the binarization circuit 58, a value indicating a defective pixel is outputted when the value from the LUT reference part 57 is larger than a predetermined threshold value and a value indicating a nondefective (normal) pixel is outputted when the value is smaller, and a defect is thereby detected on the basis of the new image. With this operation, in the defect detection apparatus 1 having the processing part 5b, by changing the contents of the LUT, it is possible to highly control the defect detection accuracy.

Figure 12:
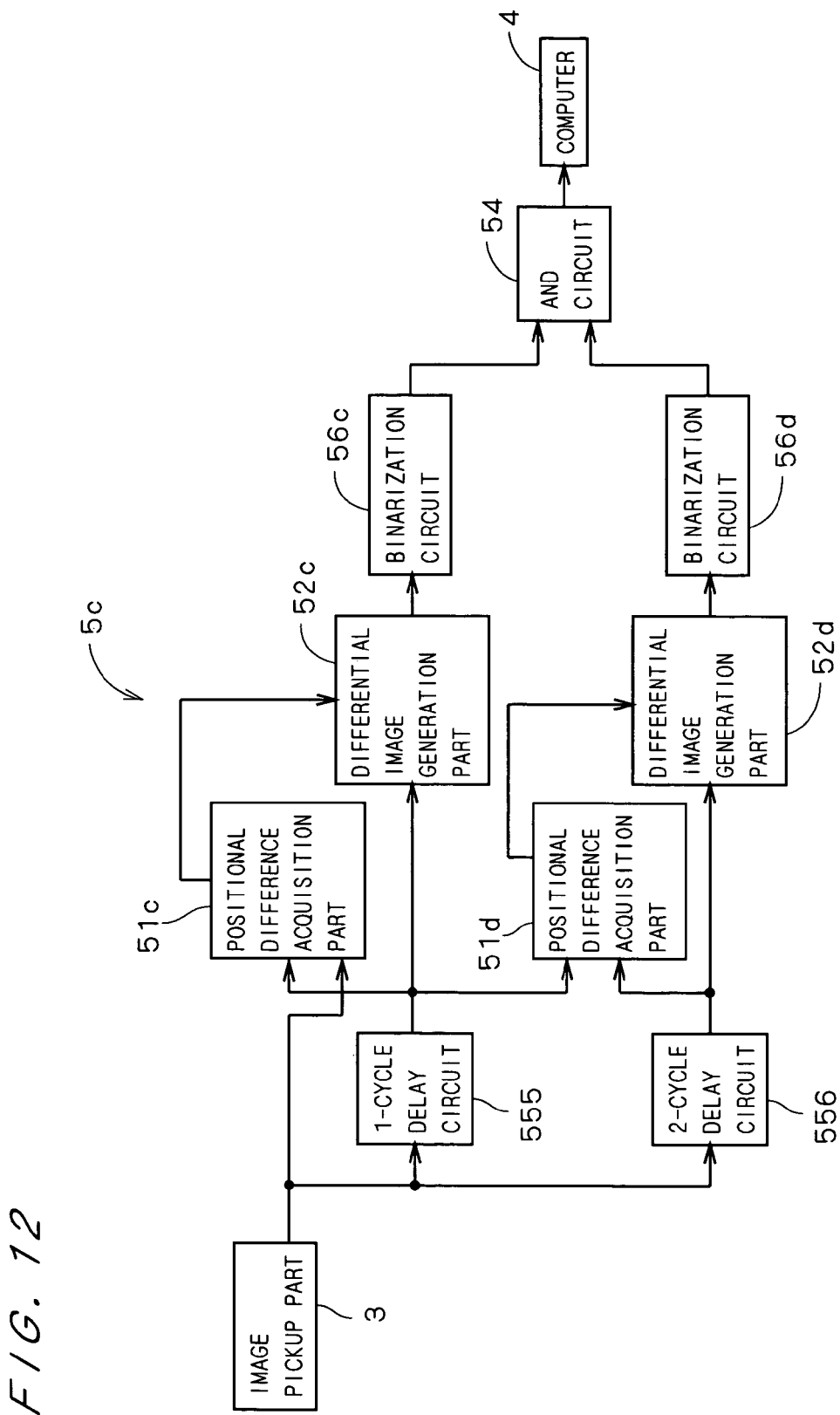
FIG. 12 is a view showing a construction of a defect detection apparatus in accordance with a second preferred embodiment.

FIG. 12 is a view showing part of a construction of the defect detection apparatus 1 in accordance with the second preferred embodiment of the present invention, and the defect detection apparatus 1 has the same constitution as shown in FIG. 1 except for a processing part 5c. In the processing part 5c, provided are two positional difference acquisition parts 51c and 51d each having a plurality of differential absolute value calculation circuits, two differential image generation parts 52c and 52d and two binarization circuits 56c and 56d.

In the defect detection apparatus 1 of FIG. 12, a grayscale image is acquired by the image pickup part 3, and pixel values of the image are outputted to the upper positional difference acquisition part 51c, a 1-cycle delay circuit 555 and 2-cycle delay circuit 556. The 1-cycle delay circuit 555 delays the pixel value by one image and outputs the delayed pixel value to the upper and lower positional difference acquisition parts 51c and 51d and the upper differential image generation part 52c. The 2-cycle delay circuit 556 delays the pixel value by two images and outputs the delayed pixel value to the lower positional difference acquisition part 51d and the lower differential image generation part 52d.

Each of the positional difference acquisition parts 51c and 51d and each of the differential image generation parts 52c and 52d in FIG. 12 has the same structure as that of the corresponding constituent element in the processing part 5a of FIG. 10, and the circuits are modified one of FIG. 2 for grayscale pixel values. In other words, in each of the upper combination of the positional difference acquisition part 51c and the differential image generation part 52c and the lower combination of the positional difference acquisition part 51d and the differential image generation part 52d, a plurality of differential absolute value calculation circuits in the positional difference acquisition parts 51c and 51d sequentially output pixel values, in parallel, of a plurality of differential images of two images in two inspection areas which are simultaneously inputted with one image moved relatively to the other image in a plurality of manners, and the positional difference selection circuit 518 selects a difference vector between the two images which corresponds to the minimum one of a plurality of additional values obtained by adding up outputs from a plurality of differential absolute value calculation circuits.

A plurality of differential absolute value calculation circuits in the second differential circuit matrix 510b of the differential image generation parts 52c and 52d sequentially output pixel values, in parallel, of a plurality of differential images of two images which are simultaneously inputted behind the inputs to a plurality of differential absolute value calculation circuits in the positional difference acquisition parts 51c and 51d with one image moved relatively to the other image in a plurality of manners. The differential selection circuit 521 selects one of the outputs from a plurality of differential absolute value calculation circuits in the second differential circuit matrix 510b on the basis of the difference vector selected by the positional difference selection circuit 518. With the above construction, the positional difference acquisition parts 51c and 51d and the differential image generation parts 52c and 52d can be easily formed of like electric circuits.

Figure 13:
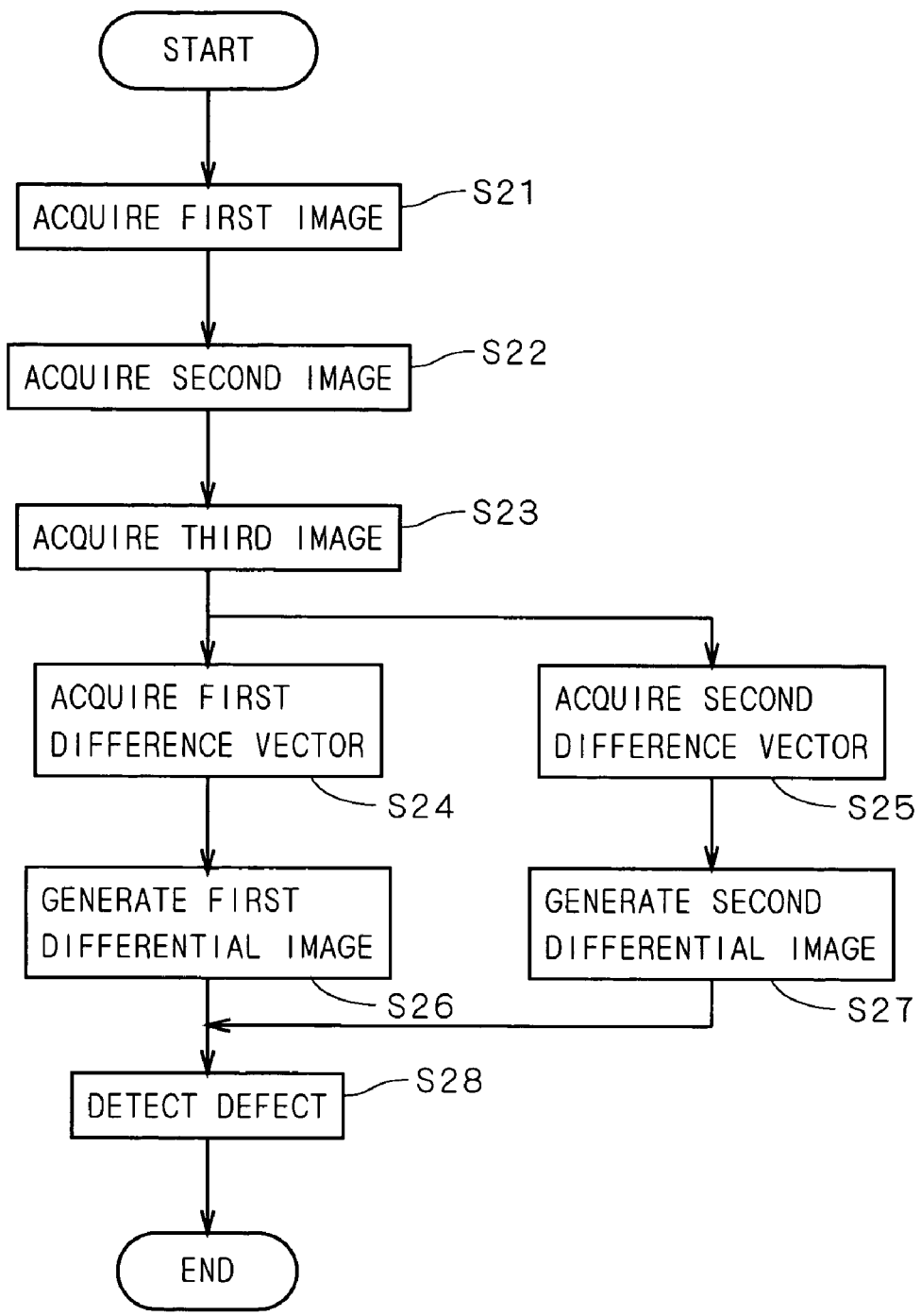
FIG. 13 is a flowchart showing an operation flow for detecting a defect on a substrate.

FIG. 13 is a flowchart showing an operation flow of the defect detection apparatus 1 having the construction of FIG. 12 for detecting a defect. In the defect detection apparatus 1 of FIG. 12, first, the image pickup part 3 picks up an image of the first inspection area on the substrate 9 to acquire the first image, and pixel values of the first image are sequentially inputted to the positional difference acquisition part 51c, the 1-cycle delay circuit 555 and the 2-cycle delay circuit 556 (Step S21). After all the pixel values of the first image are inputted, the image pickup part 3 is moved relatively to the substrate 9 to acquire the second image in the second inspection area which has the same pattern as that of the first inspection area on a die, and pixel values of the second image are inputted to the positional difference acquisition part 51c, the 1-cycle delay circuit 555 and the 2-cycle delay circuit 556 (Step S22).

Subsequently, the image pickup part 3 is further moved relatively to the substrate 9 in the same direction, the third image in the third inspection area which has the same pattern as that of the second inspection area is acquired and pixel values of the third image are inputted to the positional difference acquisition part 51c, the 1-cycle delay circuit 555 and the 2-cycle delay circuit 556 (Step S23). At this time, to the upper positional difference acquisition part 51c, the pixel values of the third image are inputted while the corresponding pixel values of the second image are inputted from the 1-cycle delay circuit 555. To the lower positional difference acquisition part 51d, the pixel values of the first image are inputted from the 2-cycle delay circuit 556 while the corresponding pixel values of the second image are inputted from the 1-cycle delay circuit 555. Then, the first difference vector between the first image and the second image is acquired in the positional difference acquisition part 51d (Step S24) while the second difference vector between the third image and the second image is acquired in the positional difference acquisition part 51c (Step S25).

In the lower differential image generation part 52d, the first differential image between the first image and the second image is generated while the position of the first image is adjusted to the second image on the basis of the first difference vector (Step S26). In the upper differential image generation part 52c, the second differential image between the second image and the third image is generated while the position of the third image is adjusted to the second image on the basis of the second difference vector in parallel with the operation of the differential image generation part 52d (Step S27). In other words, the positional difference acquisition parts 51c and 51d perform the same operation and the differential image generation parts 52c and 52d also perform the same operation, but unlike the first preferred embodiment, the processing of the first image with respect to the second image is the same as the processing of the third image with respect to the second image.

The first differential image and the second differential image are binarized in the binarization circuits 56d and 56c, respectively, and the AND circuit 54 generates a defect detection image by comparison between the pixel values of the first differential image in binary and the pixel values of the second differential image in binary, thereby to detect a defect in the second image (Step S28).

Thus, in the defect detection apparatus 1 having the processing part 5c of FIG. 12, the first difference vector and the second difference vector are acquired in parallel in the lower positional difference acquisition part 51d and the upper positional difference acquisition part 51c, respectively, and the first differential image and the second differential image are generated in parallel in the lower differential image generation part 52d and the upper differential image generation part 52c, respectively. The defect detection apparatus 1 of the second preferred embodiment can thereby quickly perform the operation for defect detection, without providing the position adjustment circuit 53 of FIG. 2, to detect a defect in a periodic pattern on the substrate 9 with high accuracy.

Figure 14:
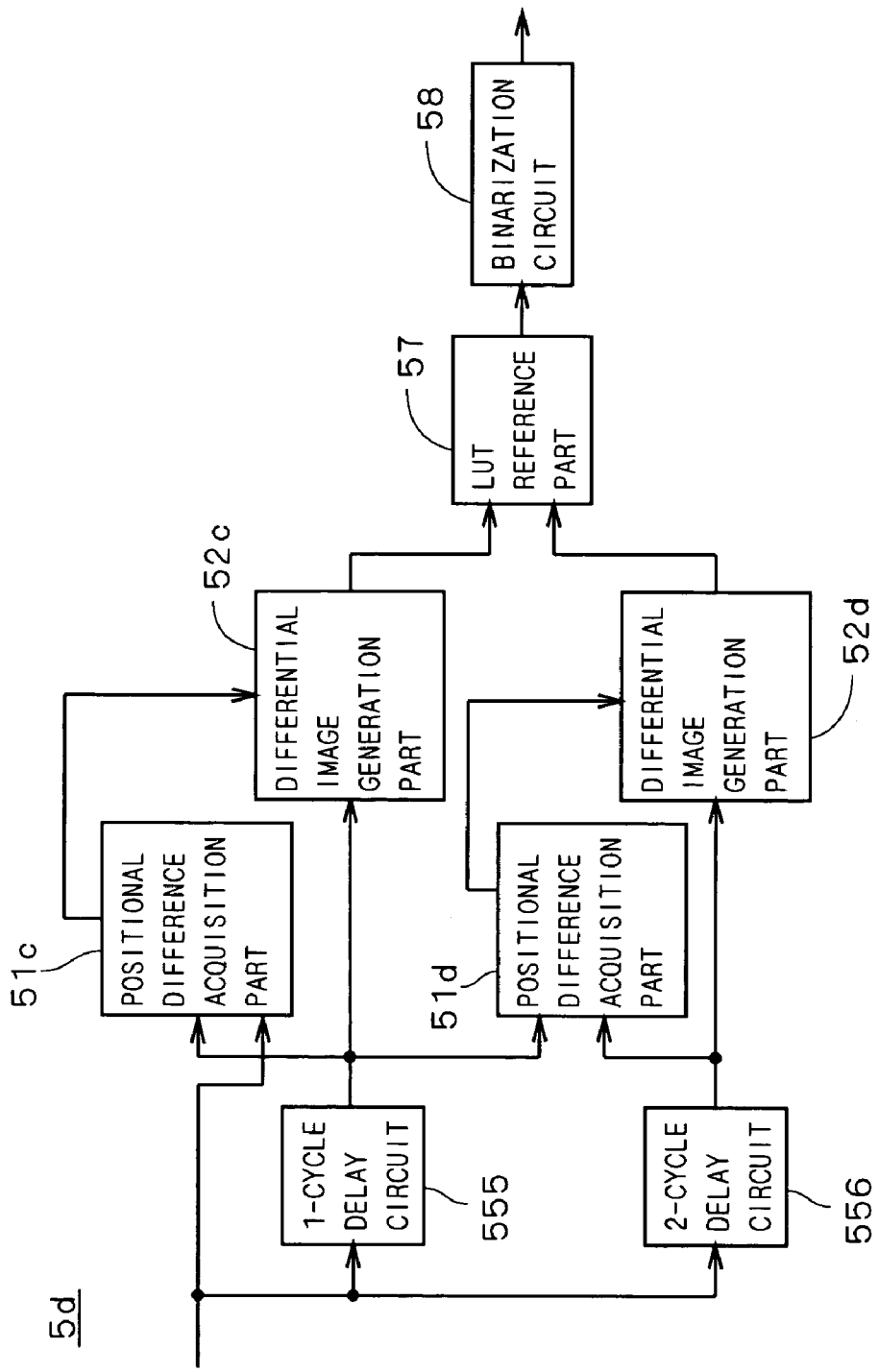
FIG. 14 is a view showing another example of the processing part.

FIG. 14 is a view showing a processing part 5d which is another example of the processing part 5c of FIG. 12. In the processing part 5d of FIG. 14, in comparison with the processing part 5c of FIG. 12, the two binarization circuits 56c and 56d are omitted and the AND circuit 54 is replaced by the LUT reference part 57 and the binarization circuit 58, and the pixel values of the differential images from the differential image generation parts 52c and 52d are thereby directly inputted to the LUT reference part 57.

The LUT reference part 57 in the processing part 5d of FIG. 14 makes reference to the LUT on the basis of the pixel values of the first differential image generated by the differential image generation part 52d, the corresponding pixel values of the second differential image generated by the differential image generation part 52c and substantially generates a new image indicating an area where both the pixel values in the first differential image and the second differential image are large, and the binarization circuit 58 binarizes the new image, to detect a defect. In the defect detection apparatus 1 having the processing part 5d, by controlling the contents of the LUT, it is thereby possible to highly control the defect detection accuracy.

Though the preferred embodiments of the present invention have been discussed above, the present invention is not limited to the above-discussed preferred embodiments, but allows various variations.

In the first preferred embodiment, depending on the design of the defect detection apparatus, the first differential image may be generated while the position of the second image is adjusted to the first image in the differential image generation part. In this case, in the position adjustment circuit, the position of the first differential image is relatively adjusted to the second differential image generated by adjusting the position of the third image to the second image on the basis of the first difference vector (or the second difference vector equal to the first difference vector). In other words, generally discussing the operation in accordance with the first preferred embodiment, in the differential image generation part, the first differential image is generated while the position of the first image is adjusted relatively to the second image on the basis of the first difference vector and the second differential image is generated while the position of the second image is adjusted relatively to the third image on the basis of the second difference vector, and in the position adjustment circuit 53, the position of the first differential image is adjusted relatively to the second differential image on the basis of the first difference vector or the second difference vector.

In a plurality of XOR circuits 513 in the first differential circuit matrix 510a and the second differential circuit matrix 510b, for example, instead of moving the first image relatively to the second image, with the second image moved relatively to the first image in a plurality of manners, the pixel values of the first differential image may be outputted in parallel. In other words, in generation of differential image by a plurality of XOR circuits 513, among two images in two inspection areas which are simultaneously inputted, one image may be moved relatively to the other image.

Though the differential image generation part calculates a difference (or an absolute value of difference) between corresponding pixel values of the two images while relatively adjusting the positions of the two images to be used as a value of each pixel of the differential image in the above-discussed preferred embodiments, for example, the square root of difference in pixel value between the two images or the like may be calculated to generate the differential image. In other words, the differential image generation part may generate a variety of differential images only if they are based on the difference in pixel value between the two images.

The functions of constituent elements in the processing part in the above-discussed preferred embodiments can be implemented by software. If at least, however, the positional difference acquisition part and the differential image generation part are formed of electric circuits, it becomes possible to detect the presence of defect at high speed. If the process is executed by software, the operation flows shown in FIGS. 3 and 13 can be easily changed as appropriate. For example, in FIG. 3, if there is no need for quickly performing the operation of defect detection, the first differential image may be generated after the second differential image is generated.

Though defect detection is performed on a pattern formed on a semiconductor substrate in the above-discussed preferred embodiments, the defect detection apparatus can be used for defect detection of a periodic pattern formed on, e.g., a printed circuit board, a glass substrate for manufacturing a flat panel display, or the like.

While the invention has been shown and described in detail, the foregoing description is in all aspects illustrative and not restrictive. It is therefore understood that numerous modifications and variations can be devised without departing from the scope of the invention.

This application claims priority benefit under 35 U.S.C. Section 119 of Japanese Patent Application No. 2004-123622 in the Japanese Patent Office on Apr. 20, 2004, the entire disclosure of which is incorporated herein by reference.

What is claimed is:

1. An apparatus for detecting a defect in a periodic pattern on an object, comprising:

an image pickup part for picking up an image of an object;

a positional difference acquisition part for acquiring a first positional difference vector between a first image in a first area on an object and a second image in a second area which has the same pattern as that of said first area and acquiring a second positional difference vector between said second image and a third image in a third area which has the same pattern as that of said second area;

a differential image generation part for generating a first differential image between said first image and said second image while adjusting a position of said first image relatively to said second image on the basis of said first positional difference vector and generating a second differential image between said second image and said third image while adjusting a position of said second image relatively to said third image on the basis of said second positional difference vector in the same manner as the case of said first positional difference vector;

a position adjustment part for adjusting a position of said first differential image relatively to said second differential image on the basis of said first positional difference vector or said second positional difference vector; and a defect detection part for detecting a defect by comparison between said first differential image after position adjustment and said second differential image, wherein said first image, said second image, and said third image are sequentially obtained in said image pickup part, acquiring said third image in said image pickup part and acquiring said first positional difference vector in said positional difference acquisition part are executed in parallel, and acquiring said second positional difference vector in said positional difference acquisition part and generating said first differential image in said differential image generation part are executed in parallel.

2. An apparatus for detecting a defect in a periodic pattern on an object, comprising:

an image pickup part for picking up an image of an object;

a positional difference acquisition part for acquiring a first positional difference vector between a first image in a first area on an object and a second image in a second area which has the same pattern as that of said first area and acquiring a second positional difference vector between said second image and a third image in a third area which has the same pattern as that of said second area;

a differential image generation part for generating a first differential image between said first image and said second image while adjusting a position of said first image relatively to said second image on the basis of said first positional difference vector and generating a second differential image between said second image and said third image while adjusting a position of said second image relatively to said third image on the basis of said second positional difference vector in the same manner as the case of said first positional difference vector;

a position adjustment part for adjusting a position of said first differential image relatively to said second differential image on the basis of said first positional difference vector or said second positional difference vector; and a defect detection part for detecting a defect by comparison between said first differential image after position adjustment and said second differential image, wherein said positional difference acquisition part comprises a plurality of first differential circuits for sequentially outputting, in parallel, pixels of a plurality of differential images between two images in two areas which are simultaneously inputted thereto, one of which is moved relatively to the other image in a plurality of different manners ; and a positional difference selection circuit for selecting a positional difference vector between said two images which corresponds to the minimum one among a plurality of additional values obtained by adding up outputs from said plurality of first differential circuits, and said differential image generation part comprises a plurality of second differential circuits for sequentially outputting, in parallel, pixels of a plurality of differential images between two images which are simultaneously inputted thereto behind those inputted to said plurality of first differential circuits, one of which is moved relatively to the other image in a plurality of different manners; and a differential selection circuit for selecting one of outputs from said plurality of second differential circuits on the basis of said positional difference vector selected by said positional difference selection circuit.

3. An apparatus for detecting a defect in a periodic pattern on an object, comprising:

an image pickup part for picking up an image of an object;

a positional difference acquisition part for acquiring a first positional difference vector between a first image in a first area on an object and a second image in a second area which has the same pattern as that of said first area and acquiring a second positional difference vector between said second image and a third image in a third area which has the same pattern as that of said second area;

a differential image generation part for generating a first differential image between said first image and said second image while adjusting a position of said first image relatively to said second image on the basis of said first positional difference vector and generating a second differential image between said second image and said third image while adjusting a position of said second image relatively to said third image on the basis of said second positional difference vector in the same manner as the case of said first positional difference vector;

a position adjustment part for adjusting a position of said first differential image relatively to said second differential image on the basis of said first positional difference vector or said second positional difference vector; and a defect detection part for detecting a defect by comparison between said first differential image after position adjustment and said second differential image, wherein said first differential image and said second differential image which are generated in said differential image generation part are grayscale images, said apparatus further comprising a binarization circuit for binarizing said first differential image and said second differential image which are inputted to said position adjustment part.

4. An apparatus for detecting a defect in a periodic pattern on an object, comprising:

an image pickup part for picking up an image of an object;

a positional difference acquisition part for acquiring a first positional difference vector between a first image in a first area on an object and a second image in a second area which has the same pattern as that of said first area and acquiring a second positional difference vector between said second image and a third image in a third area which has the same pattern as that of said second area;

a differential image generation part for generating a first differential image between said first image and said second image while adjusting a position of said first image relatively to said second image on the basis of said first positional difference vector and generating a second differential image between said second image and said third image while adjusting a position of said second image relatively to said third image on the basis of said second positional difference vector in the same manner as the case of said first positional difference vector;

a position adjustment part for adjusting a position of said first differential image relatively to said second differential image on the basis of said first positional difference vector or said second positional difference vector; and a defect detection part for detecting a defect by comparison between said first differential image after position adjustment and said second differential image, wherein said first differential image and said second differential image are grayscale images, and said defect detection part makes reference to a table with each pixel value of said first differential image and corresponding pixel value of said second differential image, generates a new image indicating an area where both pixel values of said first differential image and said second differential image are large and detects a defect on the basis of said new image.

5. An apparatus for detecting a defect in a periodic pattern on an object, comprising:

an image pickup part for picking up an image of an object;

a first positional difference acquisition part for acquiring a first positional difference vector between a first image in a first area on an object and a second image in a second area which has the same pattern as that of said first area;

a second positional difference acquisition part for acquiring a second positional difference vector between said second image and a third image in a third area which has the same pattern as that of said second area, in parallel with an operation of said first positional difference acquisition part;

a first differential image generation part for generating a first differential image between said first image and said second image while adjusting a position of said first image to said second image on the basis of said first positional difference vector;

a second differential image generation part for generating a second differential image between said second image and said third image while adjusting a position of said third image to said second image on the basis of said second positional difference vector, in parallel with an operation of said first differential image generation part; and a defect detection part for detecting a defect by comparison between said first differential image and said second differential image.

6. The apparatus according to claim 5, wherein with regard to a combination of a positional difference acquisition part and a differential image generation part corresponding to each of a combination of said first positional difference acquisition part and said first differential image generation part and that of said second positional difference acquisition part and said second differential image generation part, said positional difference acquisition part comprises a plurality of first differential circuits for sequentially outputting, in parallel, pixels of a plurality of differential images between two images in two areas which are simultaneously inputted thereto, one of which is moved relatively to the other image in a plurality of different manners; and a positional difference selection circuit for selecting a positional difference vector between said two images which corresponds to the minimum one among a plurality of additional values obtained by adding up outputs from said plurality of first differential circuits, and said differential image generation part comprises a plurality of second differential circuits for sequentially outputting, in parallel, pixels of a plurality of differential images between two images which are simultaneously inputted thereto behind those inputted to said plurality of first differential circuits, one of which is moved relatively to the other image in a plurality of different manners; and a differential selection circuit for selecting one of outputs from said plurality of second differential circuits on the basis of said positional difference vector selected by said positional difference selection circuit.

7. The apparatus according to claim 5, wherein said first differential image and said second differential image which are generated in said first differential image generation part and said second differential image generation part, respectively, are grayscale images, said apparatus further comprising a binarization circuit for binarizing said first differential image and said second differential image which are inputted to said defect detection part.

8. The apparatus according to claim 5, wherein said first differential image and said second differential image are grayscale images, and said defect detection part makes reference to a table with each pixel value of said first differential image and corresponding pixel value of said second differential image, generates a new image indicating an area where both pixel values of said first differential image and said second differential image are large and detects a defect on the basis of said new image.

9. A method of detecting a defect in a periodic pattern on an object, comprising the steps of:

acquiring a first image in a first area on an object:

acquiring a second image in a second area which has the same pattern as that of said first area;

acquiring a third image in a third area which has the same pattern as that of said second area;

acquiring a first positional difference vector between said first image and said second image;

acquiring a second positional difference vector between said second image and said third image;

generating a first differential image between said first image and said second image while adjusting a position of said first image to said second image on the basis of said first positional difference vector;

generating a second differential image between said second image and said third image while adjusting a position of said second image to said third image on the basis of said second positional difference vector in the same manner as that in said step of generating said first differential image;

adjusting a position of said first differential image relatively to said second differential image on the basis of said first positional difference vector or said second positional difference vector; and detecting a defect by comparison between said first differential image after position adjustment and said second differential image, wherein said step of acquiring a third image and said step of acquiring a first positional difference vector are executed in parallel, and said step of acquiring a second positional difference vector and said step of generating a first differential image are executed in parallel.

10. A method of detecting a defect in a periodic pattern on an object, comprising the steps of:

acquiring a first image in a first area on an object;

acquiring a second image in a second area which has the same pattern as that of said first area;

acquiring a third image in a third area which has the same pattern as that of said second area;

acquiring a first positional difference vector between said first image and said second image;

acquiring a second positional difference vector between said second image and said third image;

generating a first differential image between said first image and said second image while adjusting a position of said first image to said second image on the basis of said first positional difference vector;

generating a second differential image between said second image and said third image while adjusting a position of said second image to said third image on the basis of said second positional difference vector in the same manner as that in said step of generating said first differential image;

adjusting a position of said first differential image relatively to said second differential image on the basis of said first positional difference vector or said second positional difference vector; and detecting a defect by comparison between said first differential image after position adjustment and said second differential image, wherein said first differential image in said step of generating a first differential image and said second differential image in said step of generating a second differential image are grayscale images, said method further comprising the step of binarizing said first differential image and said second differential image before said step of adjusting a position of said first differential image relatively to said second differential image.

11. A method of detecting a defect in a periodic pattern on an object, comprising the steps of:

acquiring a first image in a first area on an object;

acquiring a second image in a second area which has the same pattern as that of said first area;

acquiring a third image in a third area which has the same pattern as that of said second area;

acquiring a first positional difference vector between said first image and said second image;

acquiring a second positional difference vector between said second image and said third image;

generating a first differential image between said first image and said second image while adjusting a position of said first image to said second image on the basis of said first positional difference vector;

generating a second differential image between said second image and said third image while adjusting a position of said second image to said third image on the basis of said second positional difference vector in the same manner as that in said step of generating said first differential image;

adjusting a position of said first differential image relatively to said second differential image on the basis of said first positional difference vector or said second positional difference vector; and detecting a defect by comparison between said first differential image after position adjustment and said second differential image, wherein said first differential image and said second differential image are grayscale images, and reference is made to a table with each pixel value of said first differential image and corresponding pixel value of said second differential image, a new image indicating an area where both pixel values of said first differential image and said second differential image are large is generated and a defect is detected on the basis of said new image in said step of detecting a defect.

12. A method of detecting a defect in a periodic pattern on an object, comprising the steps of:

acquiring a first image in a first area on an object;

acquiring a second image in a second area which has the same pattern as that of said first area;

acquiring a third image in a third area which has the same pattern as that of said second area;

acquiring a first positional difference vector between said first image and said second image;

acquiring a second positional difference vector between said second image and said third image;

generating a first differential image between said first image and said second image while adjusting a position of said first image to said second image on the basis of said first positional difference vector;

generating a second differential image between said second image and said third image while adjusting a position of said third image to said second image on the basis of said second positional difference vector; and detecting a defect by comparison between said first differential image and said second differential image, wherein said step of acquiring a first positional difference vector and said step of acquiring a second positional difference vector are executed in parallel, and said step of generating a first differential image and said step of generating a second differential image are executed in parallel.

13. A method of detecting a defect in a periodic pattern on an object, comprising the steps of:

acquiring a first image in a first area on an object;

acquiring a second image in a second area which has the same pattern as that of said first area;

acquiring a third image in a third area which has the same pattern as that of said second area;

acquiring a first positional difference vector between said first image and said second image;

acquiring a second positional difference vector between said second image and said third image;

generating a first differential image between said first image and said second image while adjusting a position of said first image to said second image on the basis of said first positional difference vector;

generating a second differential image between said second image and said third image while adjusting a position of said third image to said second image on the basis of said second positional difference vector; and detecting a defect by comparison between said first differential image and said second differential image, wherein said first differential image in said step of generating a first differential image and said second differential image in said step of generating a second differential image are grayscale images, said method further comprising the step of binarizing said first differential image and said second differential image before said step of detecting a defect.

14. A method of detecting a defect in a periodic pattern on an object, comprising the steps of:

acquiring a first image in a first area on an object;

acquiring a second image in a second area which has the same pattern as that of said first area;

acquiring a third image in a third area which has the same pattern as that of said second area;

acquiring a first positional difference vector between said first image and said second image;

acquiring a second positional difference vector between said second image and said third image;

generating a first differential image between said first image and said second image while adjusting a position of said first image to said second image on the basis of said first positional difference vector;

generating a second differential image between said second image and said third image while adjusting a position of said third image to said second image on the basis of said second positional difference vector; and detecting a defect by comparison between said first differential image and said second differential image, wherein said first differential image and said second differential image are grayscale images, and reference is made to a table with each pixel value of said first differential image and corresponding pixel value of said second differential image, a new image indicating an area where both pixel values of said first differential image and said second differential image are large is generated and a defect is detected on the basis of said new image in said step of detecting a defect.

* * * * *